(12) United States Patent
Waide

(10) Patent No.: US 8,266,976 B2
(45) Date of Patent: Sep. 18, 2012

(54) DIRECT DRIVE ELECTROMECHANICAL LINEAR ACTUATORS

(75) Inventor: William M. Waide, Adelanto, CA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 12/790,770

(22) Filed: May 28, 2010

(65) Prior Publication Data
US 2010/0242643 A1   Sep. 30, 2010

Related U.S. Application Data

(62) Division of application No. 11/140,702, filed on May 31, 2005, now abandoned.

(51) Int. Cl.
*F16H 25/22* (2006.01)

(52) U.S. Cl. .............. 74/89.26; 74/89.29; 74/39.39; 74/424.92

(58) Field of Classification Search ........... 74/89.26, 74/89.29, 89.39, 424.91, 424.92; 244/99.4
See application file for complete search history.

(56) References Cited

U.S. PATENT DOCUMENTS

| | | | |
|---|---|---|---|
| 2,630,022 A | 3/1953 | Terdina | |
| 2,966,072 A | 12/1960 | Wise | |
| 3,278,774 A | 10/1966 | Roller et al. | |
| 3,407,680 A | 10/1968 | Westmoreland | |
| 4,137,784 A | 2/1979 | Griffin et al. | |
| 4,526,053 A * | 7/1985 | Carson | 74/424.92 |
| 4,603,594 A | 8/1986 | Grimm | |
| 4,607,180 A | 8/1986 | Stoody | |
| 4,614,128 A * | 9/1986 | Fickler | 74/89.31 |
| 6,315,086 B1 | 11/2001 | Schmitt | |
| 6,531,798 B1 | 3/2003 | Palmero | |
| 7,000,495 B2 | 2/2006 | Benoit | |
| 7,628,087 B2 | 12/2009 | Gerbier et al. | |
| 2005/0132830 A1 * | 6/2005 | Gerbier et al. | 74/89.23 |

FOREIGN PATENT DOCUMENTS

| | | |
|---|---|---|
| EP | 0 404 223 A | 12/1990 |
| EP | 1 118 741 | 7/2001 |
| FR | 1 540 855 A | 9/1968 |
| GB | 2 091 375 A | 7/1982 |

OTHER PUBLICATIONS

European Search Report for PCT/US2006/015700 dated Aug. 24, 2006.

* cited by examiner

*Primary Examiner* — William C Joyce
(74) *Attorney, Agent, or Firm* — Haynes and Boone, LLP

(57) ABSTRACT

Direct drive electromechanical rotary-to-linear actuators include one or more electric motors mounted in a housing. Each motor includes a stator and a rotor. The motor drives a planetary drive mechanism that includes an elongated central shaft having one or more helical threads on an external surface coupled to the rotor for conjoint rotation. A planetary nut having helical threads on an internal surface is disposed concentric to the shaft, and a plurality of planetary rollers are disposed concentrically between the shaft and the planetary nut. Each of the rollers has a helical thread on an external surface that is complementary to and in engagement with a thread of the shaft and a thread of the nut. Rotation of the rotor is converted with mechanical advantage into linear movement of the planetary nut. The actuators provide backlash-free operation, higher stiffnesses, slew rates and frequency responses, and better overall efficiency.

15 Claims, 4 Drawing Sheets

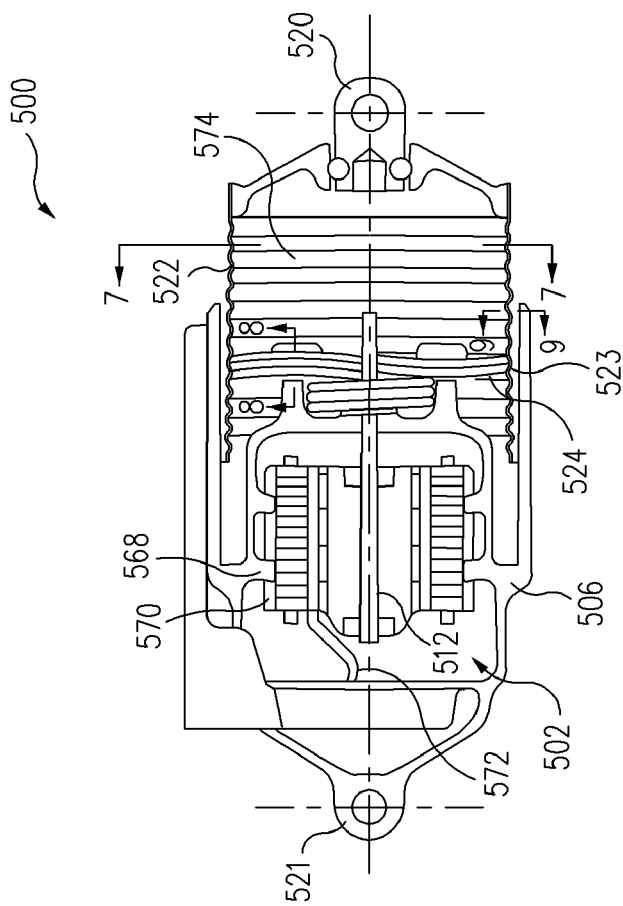
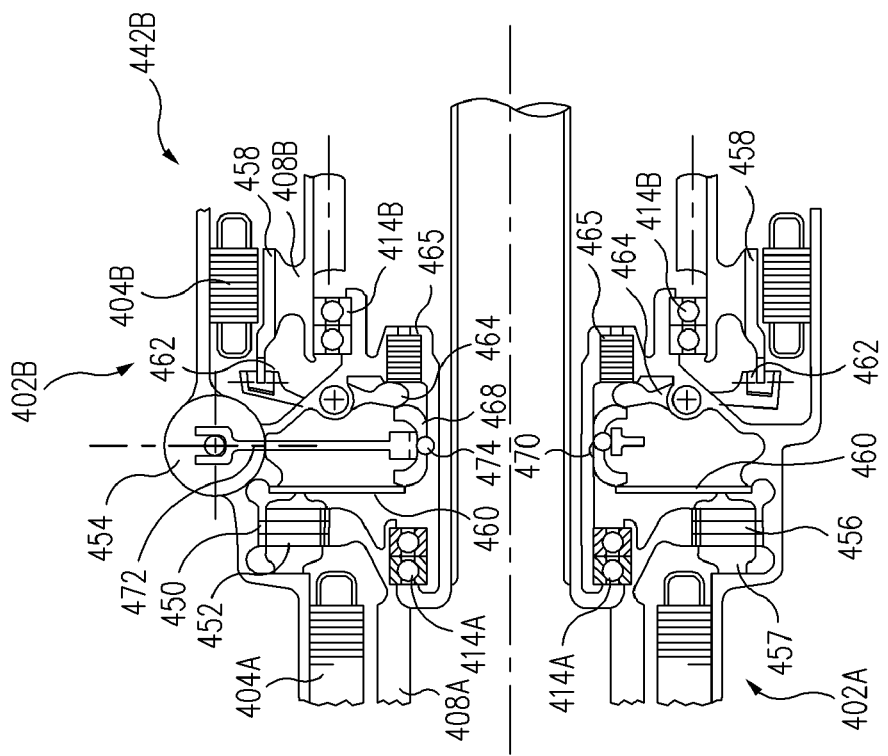
FIG. 6
FIG. 5

DIRECT DRIVE ELECTROMECHANICAL LINEAR ACTUATORS

RELATED APPLICATIONS

This application is a divisional of U.S. patent application Ser. No. 11/140,702, filed May 31, 2005, the entire disclosure of which is incorporated herein by reference.

TECHNICAL FIELD

This disclosure relates to motion control or actuation devices in general, and in particular, to direct drive electromechanical rotary-to-linear motion actuators.

BACKGROUND

Electromechanical actuators are rapidly displacing hydraulic devices in a wide range of industries, including aviation. Improvements in solid state switching devices, their digital control and in the performance of magnetic materials have all contributed to an increased interest in electric actuators. Electromechanical linear actuators are particularly well suited to flight control applications, as well as a multitude of industrial uses, particularly in production automation. Automotive and other vehicle applications also abound, as may be found, for example, in the variable transmissions and caliper or disk brake actuators described in, e.g., U.S. Pat. Nos. 6,837,818 and 6,626,778 to Kapaan et al., and U.S. Pat. Nos. 6,367,597 and 6,318,512 to De Vries et al.

Flight applications, such as actuation of control surfaces, helicopter rotor blades, lift enhancement devices, landing gear deployment and braking, door opening, and the like, are all best handled with linear actuators. Rotary-to-linear conversions, correctly engineered, can provide backlash-free operation, high stiffness, high slew rates, good overall efficiency and high frequency response, which properties are all needed in combination for an ideal flight control actuator.

Concomitant with their widespread adoption, certain shortcomings in various mechanical aspects of the devices have also become apparent, and therefore merit attention. These problems include backlash, wear, complexity and cost and life limitations.

Accordingly, there is a long-felt but as yet unsatisfied need in a number of fields for linear actuators that overcome the backlash, rapid wear, complexity, high cost and limited life problems incident to prior art actuators, and that provide backlash-free operation, higher stiffnesses, slew rates and frequency responses, and better overall efficiency.

SUMMARY

In accordance with the various example embodiments disclosed herein, direct-drive electromechanical rotary-to-linear actuators are provided that address and overcome many of the above and other shortcomings of prior art actuators.

In one example embodiment thereof, a direct drive electromechanical rotary-to-linear actuator includes an elongated housing and an electric motor, including a stator fixed in the housing and a rotor supported for rotation relative to the stator, coupled to a planetary drive unit. The drive unit comprises an elongated central shaft coupled to the rotor for conjoint rotation therewith and has a plurality of helical threads on an external surface thereof. A planetary nut having a plurality of helical threads on an internal surface thereof is disposed concentric to the shaft, and a plurality of planetary rollers, each having a helical thread on an external surface thereof that is complementary to and in engagement with both a thread of the shaft and a thread of the nut, is disposed concentrically between the shaft and the planetary nut.

In one advantageous variation thereof, the central shaft of the actuator is made integral to the rotor of the motor and constructed of a magnetically permeable material, e.g., an alloy steel. The stator can comprise high-cobalt-content laminations and the rotor can comprise neodymium-iron magnets.

In another variation, the central shaft can include a hollow center, with a linear variable displacement transducer ("LVDT") disposed therein for measuring the absolute position of an output end of the actuator relative to a fixed end thereof.

In another variation, a plurality of axial grooves can be provided in the housing adjacent to the planetary nut, and a plurality of axial splines can be provided on the nut, each of which is slidably disposed in a respective one of the grooves to prevent rotation of the nut relative to the housing and thereby react any torque on the nut to adjacent machine structure.

In another variation, the elongated rotor is of common material to the planetary nut housing which is coupled to the annular shaft within the annulus thereof to conserve actuator length and provide a double-ended actuator if desired. An absolute-angular-position encoder can be rotatably coupled to the central shaft for detecting the absolute linear position of the shaft.

In another example embodiment, the actuator can include a second electric motor, e.g., a backup motor, including a second stator fixed in the housing and an elongated annular second rotor supported for rotation relative to the second stator. The associated planetary drive unit of this embodiment comprises a planetary nut that is coupled to the annular second rotor within the annulus thereof for both conjoint rotation and relative axial sliding therein. As above, a plurality of threaded planetary rollers is disposed concentrically between the central shaft and the planetary nut, and means are provided for selectably locking the respective rotors of the two motors against rotation, thereby providing a "fail operational" mode of the actuator in the case of a malfunctioning main motor.

In one possible alternative implementation of this embodiment, at least one of the two motors, e.g., the backup motor, comprises a "pancake motor," and the malfunctioning main motor locking means can comprise a double-armature, double-disc, solenoid clutch brake operable to selectably lock/unlock respective ones of the two rotors.

In another alternative implementation, e.g., in a high power actuator application, the rotor locking means can comprise a clutch plate mounted on the rotor of the main motor for conjoint rotation and positioned such that it rotates between the jaws of a caliper brake. A plurality of rocking levers having rollers disposed at respective first ends thereof are arranged to move between a first orientation, in which the rollers engaged in respective slots in an end of the rotor of the backup motor, and a second orientation in which the rollers are disengaged from the slots. A plurality of first springs biases the rocking levers into the first orientation, such that the backup motor is locked against rotation during normal operation. A second spring, e.g., a belleville spring, biases the jaws of the caliper brake together and against the clutch plate on the main rotor, to thereby clamp the rotor against any rotation during a malfunction. A spool is moveable between a first position compressing the second spring and thereby relieving the bias of the second spring on the caliper brake jaws during normal operation of the main motor, and a second position locking the main motor and urging the rocking levers against the bias of the first springs and into the second orientation thereof, thereby unlocking the backup motor for rotation.

Means are provided for releasably holding the spool in the first position during normal operation of the actuator. In a simple yet reliable implementation, these means can comprise a plurality of ball bearings disposed in apertures in the spool and held captive in an adjacent circumferential groove by an arm of a solenoid. The same solenoid can be used to selectably release the spool from the first position for movement to the second position, e.g., in response to a malfunction of the main motor, whereupon the actuator rapidly switches to a "fail operational" mode in which the backup motor takes over operation of the actuator from the malfunctioning main motor.

In yet another example embodiment that is advantageously adapted to miniaturized actuator applications, the actuator can comprise an electric motor that includes a stator supported for axial movement in a stator housing, and a rotor supported in the housing for conjoint axial movement with, and rotation relative to, the stator. The planetary drive unit of this embodiment comprises an elongated, narrow, unthreaded cylindrical spindle having a long axis and coupled to the rotor for conjoint rotation therewith. In the place of a planetary nut, a drum having a thin, cylindrical sidewall with a plurality of helical corrugations therein is disposed concentric to the spindle. In the place of elongated, planetary rollers, a plurality of disc-like rollers is disposed in a radially symmetrical array about the spindle. Each of the rollers is mounted on the stator housing for rotation about an axis that is skewed at an angle equal to the pitch angle of the drum corrugations, and each has a circumferential surface with convolutions that correspond to the corrugations in the drum. The circumferential surface of each of the rollers is disposed in frictional engagement with both the spindle a respective one of the corrugations of the drum.

In an alternative embodiment, the rollers can be located in adjacent planes perpendicular to the spindle, each plane containing a radially symmetrical array of two or more rollers. In another advantageous variation, the wall of the drum can be strained from a cylindrical shape to a trochoidal shape incorporating a plurality of longitudinal zones having a smaller radius alternating with a plurality of longitudinal zones having a larger radius. The resulting beam-bending thereby imposed in the wall of the drum, coupled with the stiffening effect of the corrugations therein, provides an inward-directed restoring force that engages the rollers in diametral compression between the walls of the drum and the motor spindle.

A better understanding of the above and many other features and advantages of the present disclosure may be obtained from a consideration of the detailed description of the example embodiments thereof below, particularly if such consideration is made in conjunction with the appended drawings, wherein like reference numerals are used to identify like elements illustrated in one or more of the figures therein.

BRIEF DESCRIPTION OF THE DRAWINGS

FIG. 5 is an enlarged detail view of an alternative embodiment of a clutch brake mechanism to that shown in the encircled area 5-5 of FIG. 4;

FIG. 6 is a cross-sectional side elevation view of a fifth example embodiment of a direct drive electromechanical linear actuator in accordance with the present disclosure;

DETAILED DESCRIPTION

This disclosure describes various example embodiments of novel, direct-drive, electromechanical, rotary-to-linear actuators. As variously illustrated in the figures, the example mechanism that converts rotation to translation in the various embodiments is a helically threaded, planetary-nut-and-shaft arrangement of a type such as is described in U.S. Pat. No. 3,884,090 to L. I. Dock. Unlike a conventional nut/thread combination, such an arrangement comprises three elements, viz., 1) a central shaft, or lead screw, containing one or more external helical threads; 2) a grouped set of rollers or "planets" incorporating a corresponding external helical thread; and, 3) a "nut," or housing containing a plurality of corresponding internal helical threads circumscribing the former two elements. These elements can be respectively analogized to those of a conventional concentric planetary gear arrangement of a type that includes a "sun gear," a set of "planetary gears," and a "ring gear" circumscribing the two former elements. However, as discussed below, such planetary gear trains have certain drawbacks that are overcome by the embodiments of the present disclosure. Further, as will be appreciated by those of skill in the art, other types of nut arrangements, such as a ball-screw-and-nut, acme-thread-and-nut, recirculating-ball-nut, or plain thread and nut can also function to some effect, and may be substituted for the above planetary-nut-and-shaft arrangement in some of the embodiments described herein.

As shown herein, when driven by an electric motor, or motors, several advantageous embodiments incorporating such planetary-nut-and-shaft arrangements are possible, and provide useful mechanical or reliability improving outcomes not previously found in prior art actuators. This disclosure is thus directed to non-geared arrangements of components, sometimes referred to as "direct drive" actuators. The use of direct drive avoids the backlash, complexity, efficiency and reliability issues associated with prior art actuators that incorporate gear trains. Thus, while some gear tooth forms may appear in some of the embodiments described and illustrated herein, it should be understood these are used for alignment purposes only, and not for power transmission purposes. For example, the rollers in a planetary nut may have small gears disposed at each end that mesh with corresponding internal sets of teeth at corresponding ends of the nut. It should be understood that these function only to maintain the rollers parallel to the shaft and nut during operation of the device, and are not used to transmit either torque or thrust.

First Example Embodiment

Figure 1:
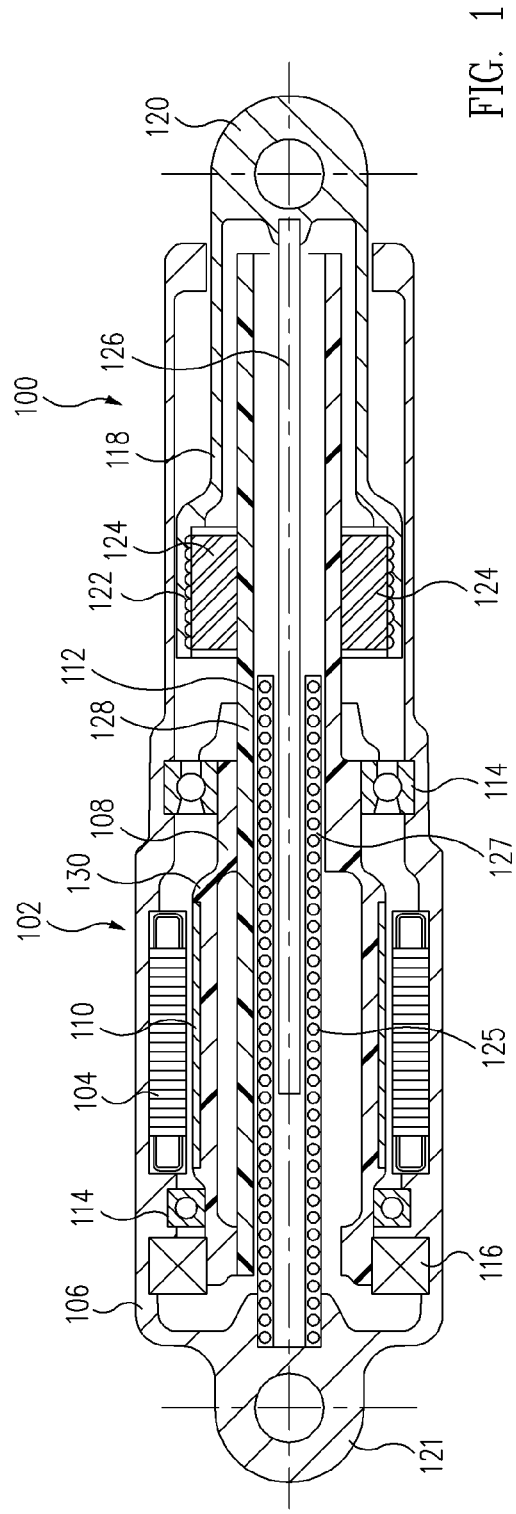
FIG. 1 is a cross-sectional side elevation view of a first example embodiment of a direct drive electromechanical linear actuator in accordance with the present disclosure.

Turning now to the figures, a first example embodiment of a direct drive electromechanical linear actuator 100 in accordance with the present disclosure, comprising a single motor, single-ended device, is illustrated in the cross-sectional side elevation view of FIG. 1. The actuator 100 comprises a brushless electric motor 102 having a stator 104 mounted in an elongated housing 106. A rotor 108 incorporating permanent magnets 110 and an elongated, externally threaded central shaft, or lead screw 112, is rotatably supported in the housing by a set of bearings 114. The rotor 108 supports a motor encoder 116 of a known type, which functions as a substitute for a motor commutator, for conjoint rotation with the rotor. A tubular output extension 118 having an output end 120, and containing an internally threaded planetary roller nut 122 located at the opposite end thereof, is disposed coaxially within and guided by the housing for both rotation about and translation along the long axis of the actuator. A set of externally threaded planetary rollers 124, each having one or more threads simultaneously engaging corresponding threads in both the lead screw 112 and the planetary roller nut 122, is disposed coaxially between the latter two features for both rotation about and translation along the long axis of the device.

In use, the housing 106 of the actuator 100 is attached to adjacent machine structure (not illustrated), and the output end 120 is attached to the component to be actuated (not illustrated). Optionally, a linear variable displacement transducer ("LVDT") 125, comprising a magnetically permeable rod 126 disposed concentrically within a pair of electromagnetic coils 127 contained in the central shaft 112, is mounted for relative axial movement within the coils to sense the absolute position of the output end of the actuator relative to the other, fixed end 121 thereof. In this, the simplest of actuator configurations, the torque developed by the motor 102 and transmitted to the output end 120 via the central shaft and nut 122 is reacted by adjacent structure (not illustrated), and optionally, at the output end by the actuated device, such that the nut is prevented from rotating, and hence, limited to only translational motion along the long axis of the device.

A close examination of the actuator 100 of FIG. 1 reveals that the structure of the rotor 108 can be implemented in two alternative configurations. In the first of these, the lead screw 112 portion of the rotor can comprise a separate, externally threaded annular tube 128 that is supported at one end, e.g., by a shrink fit technique, concentrically within, and thereby coupled directly to, a separate annular rotor portion 130, as illustrated in the half-portion of the figure above the centerline of the actuator of FIG. 1. Alternatively, the lead screw and rotor portions can be manufactured integrally from a single piece of magnetically permeable material, as illustrated in the half-portion of the figure below the actuator centerline. The high-torque motor 102 is preferably constructed from high-cobalt-content laminations used in the stator 104 and neodymium-iron magnets 110 attached to the rotor 108. While the resulting motor is slightly larger than that which might be expected for an actuator of a comparable output force whose motor drives through a reduction gearset, it should be noted that no gears or bearings are required in the actuator, other than those used to support the rotor/shaft components for rotation, as described above. Consequently, the foregoing combination of features, together with the elimination of any gear trains, results in an overall savings in actuator cost and weight, enhanced actuator life and reliability, a complete elimination of backlash, a gain in slew rate speed, and improved actuator stiffness and frequency response.

Second Example Embodiment

Figure 2:
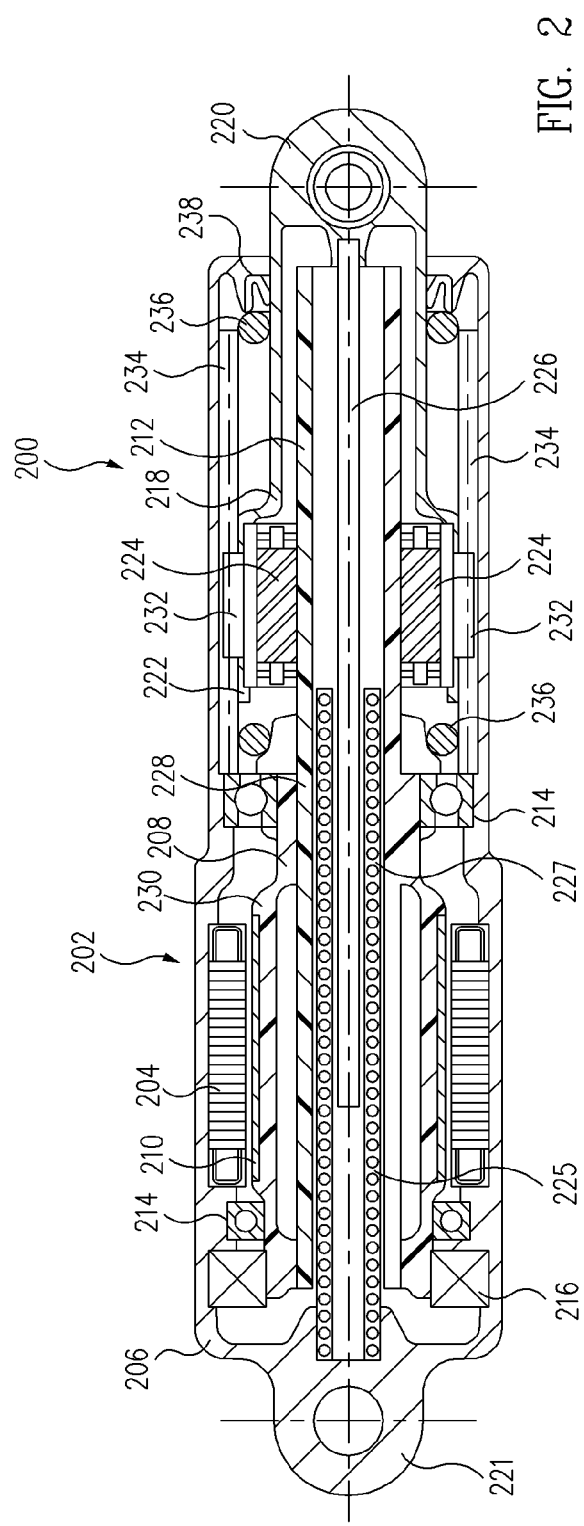
FIG. 2 is a cross-sectional side elevation view of a second example embodiment of a direct drive electromechanical linear actuator in accordance with the present disclosure.

A second example embodiment of a direct drive electromechanical linear actuator 200 in accordance with the present disclosure, comprising a single motor, single-ended device with internal torque reaction, is illustrated in the cross-sectional side elevation view of FIG. 2. As may be seen by a comparison of the respective first and second embodiments of FIGS. 1 and 2, the second embodiment of actuator 200 incorporates several of the features of the first embodiment of actuator 100, but with the addition of a nut-and-output-end anti-rotation feature 232 and 234, as illustrated in FIG. 2. In particular, in the second embodiment, low-friction (e.g., Teflon) splines, or sliders 232, are disposed on the planetary nut 222 to slide with a slight interference fit in complementary longitudinal grooves, or tracks 234, disposed in the housing 206. The motor 202, and hence, the torque on the nut 222, is thereby reacted directly back to the housing, in a manner that prevents any rotational backlash between the nut and housing.

As a result of this arrangement, the position-to command fidelity of the actuator 200 is not affected by any free movement that might be present in another type of arrangement, e.g., a gear train arrangement. This embodiment of the actuator can thus be mounted on ball joints (e.g., as a pin-jointed link) at either or both ends 220 and 221 thereof, and can be used, e.g., between machine parts that move along different axes, because all torque reactions occur internally of the actuator. Optional elastomeric anti-jamming travel stops 236 and a sliding seal 238 disposed around the tubular output extension 218 can also be provided, as shown in FIG. 2, to softly limit the end positions of the output extension and exclude dirt and moisture from the interior of the device.

The difference in the material bulk moduli between the low-friction sliders 232 and the complementary housing tracks 234 within which they slide ensures that the relative movement of the fixed and moving parts of the actuator 200 is accomplished with low frictional losses and a complete avoidance of any clearance over a long life span. This enables backlash-free operation of the actuator and the achievement of high-frequency motion.

Third Example Embodiment

Figure 3:
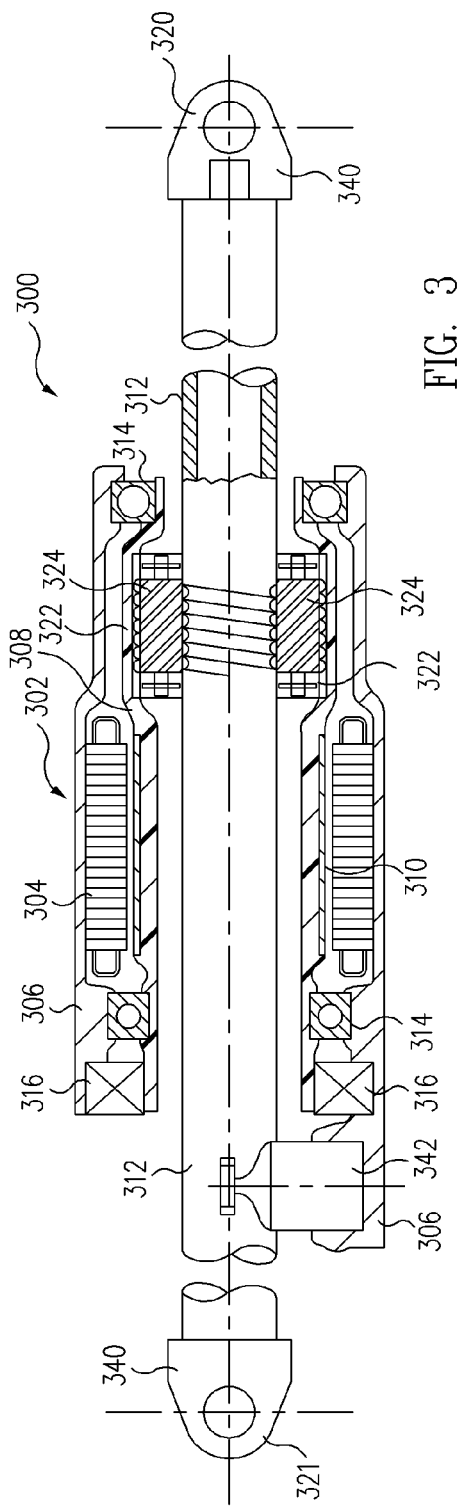
FIG. 3 is a cross-sectional side elevation view of a third example embodiment of a direct drive electromechanical linear actuator in accordance with the present disclosure.

A third example embodiment of a direct drive electromechanical linear actuator 300 in accordance with the present disclosure, comprising a single motor, and either a single- or double-ended device with enhanced travel range, is illustrated in the cross-sectional side elevation view of FIG. 3. As in the first and second embodiments above, a brushless electric motor 302 includes a stator portion 304 fixedly mounted in a housing 306. A rotor portion 308 is also rotatably supported in the housing by a set of bearings 314, and the rotor portion may also support a motor encoder 316 for conjoint rotation, as in the embodiments above.

As illustrated in FIG. 3, the rotor portion 308 of the motor 302 of the third embodiment is made as an elongated annular shaft on which neodymium-iron magnets 310 are mounted, as in the above embodiments, and in which the nut 322 of the planetary roller screw is concentrically mounted. The non-rotating central shaft, or lead screw 312, has a clevis arrangement 340 disposed at one or both ends thereof to attach the component(s) to be actuated. The lead screw itself can also be made hollow internally, as shown, for weight saving. An absolute-angle-position encoder 342 for measuring the absolute axial position of the central shaft is rotatably coupled to the shaft with a helical gear (not illustrated) in engagement with the threads of the lead screw 312.

As may be seen by reference to FIGS. 1, 2 and 3, the total travel length, as well as the structural length of the actuator 300 is substantially increased, relative to those of the first and second embodiments of actuator 100 and 200 described above. In particular, if actuator "dead length" is defined as the sum of all the length elements of the actuator that do not contribute to travel, then actuators with "closed" centers will have a maximum length that is equal to their dead length plus their travel length, whereas, actuators with "open" centers will have a maximum length that is equal to their dead length plus twice their travel length. This characteristic of the first and second embodiments described above, which are closed center devices, makes the structural length and weight of long-travel actuators an issue of increasing concern as the length of travel of the device increases. However, the third embodiment of actuator 300, having open centers, has a constant and compact dead length, making the device more suitable for long-travel applications. In this embodiment, motor torque must be transferred from the housing 306 to adjacent machine structures (not illustrated), and hence, to the actuated devices (not illustrated) mounted to the opposite ends of the central shaft 312 to complete the load path of the actuator.

It may be further appreciated in connection with the third example embodiment of actuator 300 that, by combining the nut 322 feature of a planetary roller screw arrangement directly with a hollow rotor portion 308 of an electric motor, and further, by combining the nut as an integral part of the magnetic material of the rotor, as illustrated in the alternative cross section of the rotor half-portion below the centerline of the actuator of FIG. 3, such combination enables the passage of a lead screw 312 having a relatively long length, which is limited only by the stiffness, stability and support requirements of the device. The actuator 300 is therefore particularly well suited to long-travel applications.

Fourth Example Embodiment

Figure 4:
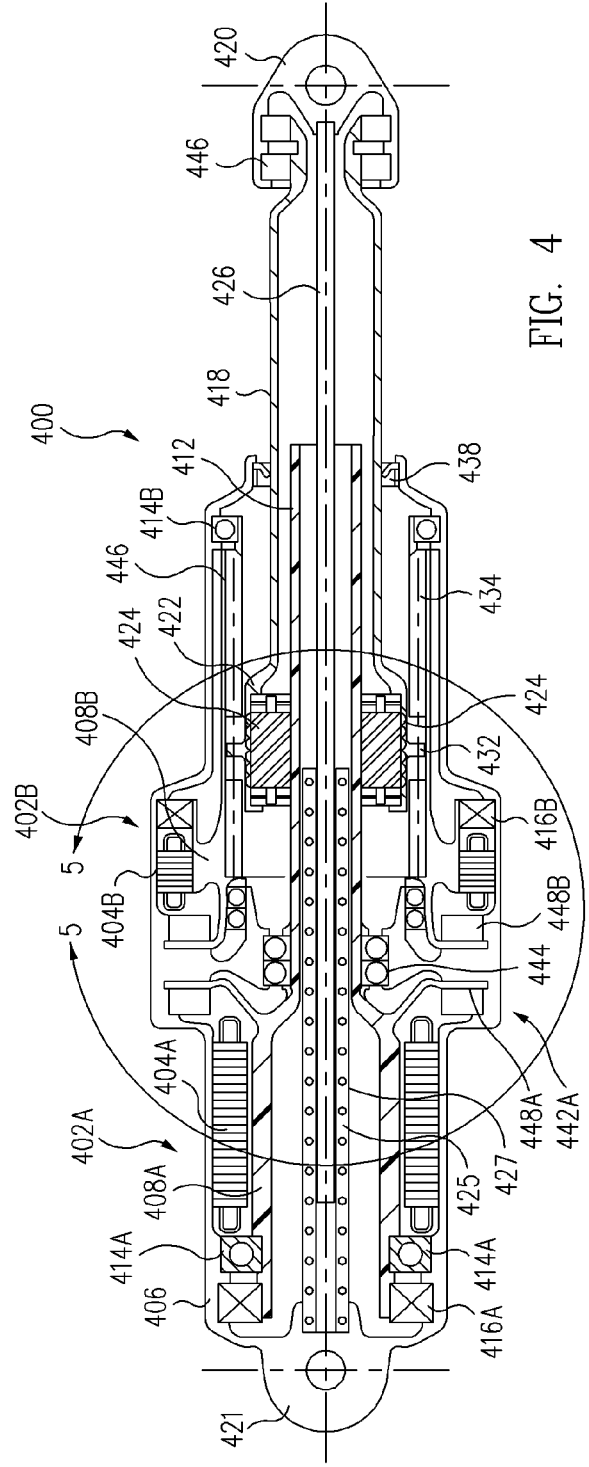
FIG. 4 is a cross-sectional side elevation view of a fourth example embodiment of a direct drive electromechanical linear actuator in accordance with the present disclosure, in which a clutch brake mechanism thereof is shown in the encircled area 5-5.

A fourth example embodiment of a direct drive electromechanical linear actuator 400 in accordance with the present disclosure, comprising a dual motor, single output, internal-torque-reacting actuator with a substantial degree of redundancy, is illustrated in the cross-sectional side elevation view of FIG. 4. Of importance, the fourth embodiment of actuator 400 comprises a pair of brushless electric motors, viz., a main motor 402A and a backup motor 402B. As illustrated in FIG. 4, the respective stators 404A, 404B of the two motors are fixedly mounted in the actuator housing 406. The housing also mounts the bearings sets 414A and 414B for the respective motor rotors 408A and 408B, respective motor encoders 416A and 416B, and in the particular alternative embodiment illustrated in FIG. 4, the housing 406 also mounts the windings (not illustrated) for a double-armature, double disc solenoid clutch brake 442A, as well as a set of thrust bearings 444 for the central shaft, or lead screw 412, of the actuator. As may be seen in FIG. 4, the lead screw 412 is common to and an extension of the rotor 408A of the main motor 402A. A rotating support element 446 with internal axial grooves 432 supports the planetary roller nut 422 and is formed common to and as an extension of the rotor 408B of the backup motor 402B. The roller nut 422 itself includes low-friction sliders 432 that slide within the grooves 434 of the rotating support element 446 for reacting torque internally within the actuator 400, as described above in connection with the second embodiment of actuator 200, and is disposed in the tubular actuator output extension 418, which terminates in a clevis 440 mounted on thrust bearings 446 at the output end 420 of the actuator 400. The actuator is environmentally sealed with a sliding resilient seal 438 disposed around the tubular output extension 418, and with ball joints (not illustrated) fitted at each end thereof, functions as a pin-jointed link without reacting any torque to its mounting structure. Clutch plates 448A and 448B of the solenoid clutch brake 442A, comprising a high-friction material, e.g., carbon-graphite and/or asbestos, are attached respectively to the rotors 408A, 408B of the main and backup motors 402A, 402B.

During normal operation of the fourth embodiment of actuator 400, the main motor 402A has the lower inertia of the two motors 402A, 402B, and is therefore preferred for high-frequency operation. By contrast, the backup motor 402B is preferably configured in a "pancake" form, i.e., one having a relatively shorter length and a relatively larger diameter, so that the planetary nut 422 and sliders 432 can operate within its inside diameter, thereby conserving actuator length. In normal operating mode, the clutch brake 442A for the backup motor 402B is spring loaded to engage and lock the rotor 408B. The slider grooves 434 of the nut anti-rotation element 446 are thus held static, and nut torque is normally reacted through the engaged backup motor clutch. The clutch brake 442A for the main motor 402A is spring loaded to be normally disengaged, and is thus normally out of contact with the main rotor 408A.

The main and backup motors 402A and 402B of the actuator 400 are provided with independent power, motor control and motor-encoding circuits. A malfunction of the main motor 402A or its control will show as an incorrect or non-existent response to a position command. This detection is extremely rapid. For example, the main motor 402A could be shorted, stationary, moving slowly, dithering, or accelerating at full power to an un-commanded position. In all such malfunction scenarios, it is necessary that the malfunctioning motor be frictionally arrested as quickly as possible. To effect this, the solenoid clutch brake 442A is electrically activated and latched to a "backup" state, namely, malfunctioning motor locked, and backup motor freed. Accordingly, the clutch brake 442A is sized to arrest the full torque of a powered motor. The solenoid windings of the brake are likewise sized to permit being energized constantly, and hence, to produce the coercive force needed for engagement of the appropriate friction plate 448A or 448B without overheating.

In this "fail operational" mode, the actuator 400 now operates with a rotating nut 422 riding on a static central shaft 412, and functions normally, although with reduced frequency response because of the inertia of the larger-diameter components in the "backup" path. Operation of the single LVDT 425 is unaffected by the drive path change. Notably, both the roller screw mechanism and the LVDT are considered to be of such high reliability as to not warrant redundancy. If, after investigation, the fault is found to be in the prime path motor controller, this embodiment of actuator will revert without any external attention (i.e., by absence of a solenoid command) to normal operation via the main motor 402A.

As may be seen from the foregoing, the fourth example embodiment of the actuator 400 combines many of the benefits of the first, second and third embodiments described above, namely, freedom from backlash, high slew rate, high system stiffness and long life, with a substantial degree of redundancy by incorporating the space-saving benefits of a backup motor 402B, shaped as a "pancake," with internal space used advantageously for the above planetary nut-andslider arrangement. Also incorporated is a unique packaging arrangement in which the respective lamination cores of the solenoid windings (not illustrated) of the respective rotor clutch brakes are disposed back-to-back in a rigid, monolithic structure that is attached to the housing 406, and thus serves as a robust load path for transferring the substantial axial loads imposed by the main motor 402A and the thrust and backup motor bearings 444 and 414B to the housing, thereby enabling a substantial reduction in size to be achieved, with the result that the redundant actuator is only about 20% longer than the single-motor actuator 200 of the second embodiment described above.

An alternative implementation of a double-armature, double-disc solenoid clutch brake mechanism 442B of the fourth embodiment of actuator 400 is illustrated in the enlarged detail view of FIG. 5. In this alternative implementation, the redundancy features of the actuator 400 are modified by redefining the concept, method and manner of effectuation of the drive conversion process in going from the Main to the Fail Operation modes, to enhance the suitability of the actuator design to very large devices of 20 kW power and larger, as well as for use in manned-flight operations.

FIG. 5 (viewed in conjunction with FIG. 4), illustrates the layout of the alternative clutch brake 442B components disposed between the main and backup motors 402A and 402B, which, as discussed above, are of conventional and pancake configurations, respectively. As above, the housing 406 contains the stators 404A and 404B of both motors, splines 450 for mounting static clutch plates 452 associated with the main motor 402A, and mountings for a tangentially positioned solenoid 454, and the thrust bearing sets 414A and 414B of both the main and backup rotors 408A, 408B, respectively.

The main motor rotor 408A is radially extended and splined to accept a rotating clutch plate 456 of a high-friction material disposed between the jaws of a caliper clutch brake 457. In contrast, the backup motor rotor 408B is axially extended to form a drum 458 having axial slots at an end thereof. The rotating clutch plate of the main rotor 408A is alternately locked against, or unlocked for, rotation about the central axis by means of the compressive force of a belleville spring 460 acting against a moveable one of the jaws of the caliper clutch brake. In contrast, the backup rotor 408B is alternately locked against, or unlocked for, rotation by the engagement or disengagement of rollers 462, disposed at the respective ends of a plurality of reciprocating rocking levers 464, in the respective axial slots in the end of the backup rotor drum extension 458 in the following manner.

As shown in FIG. 5, the rollers 462 are mounted at one end of the respective rocking levers 464. A plurality of first springs 465 resiliently bias respective ones of the other ends of the rocking levers such that the rollers 462 at the first ends respectively engage the axial slots in the end of the backup rotor 408B drum extension 458, thereby locking it against rotation. The space between the belleville spring 460 and the inner ends of the rocking levers is occupied by a flanged, annular shuttle, or spool 468, capable of axial sliding on a concentric cylindrical surface that contains an external annular locking groove 470. An arm 472 of the solenoid 454, which is arranged to move tangentially and rotate in-plane, holds individual ball bearings 474 captive in the annular locking groove 470, thereby preventing axial movement of the spool 468. In this holding position, the spool 468 holds the belleville spring 460 in a compressed state, thereby relieving any pressure by the spring on the jaws of the caliper brake 457, and thus freeing the clutch plate 456 of the main rotor 408A for rotation, and at the same time, through its contact with the inner ends of the rocking levers 464, holding the rollers 462 at the outer ends of the rocking levers 464 in locking engagement with the slots in the end of the backup rotor drum extension 458, as illustrated in the half-portion of the actuator located above the centerline of FIG. 5. When disposed in this locked position, all components are mechanically inert, and the state of the actuator 400 cannot change except by outside intervention, namely, by the transmission of an unlock command to the solenoid 454.

Those of skill in the art will appreciate that, as the size, power and hence, torque rating of an actuator increases, the ability of a direct-acting solenoid clutch combined with a friction element (as in the alternative clutch brake embodiment of FIG. 4) to react torque effectively becomes increasingly limited. In the example 20 kW actuator 400 considered here, torques are on the order of 250 ft-lb$_f$. Accordingly, the state change that occurs in going from the main to the backup mode upon fault detection is desirably irreversible, except by subsequent external intervention for re-setting of the actuator. The advantages that result from the set-state being triggered to change irreversibly are particularly applicable to high-power actuators.

By definition of the nut-reaction torque path, the rotor 408B of the backup motor 408B is a statically reacting torque. An effective, reliable method of releasing this torque is by means of the rollers 462 positioned with their respective rolling axes disposed normal to the plane of the applied force. As described above, the main motor 402A fault mode can be one of being stalled, moving slowly, dithering, or having a full torque speed excursion. In all such cases, the main rotor 402A is best arrested by using a clutch plate 456 having a high coefficient of friction (e.g., carbon-on-carbon), clamped between the jaws of the caliper brake 457 by a high-force spring. One advantageous characteristic of the belleville spring 460 is that its release force increases non-linearly with travel. This means that the force required to hold the main rotor 408A in the unlocked state (effected through the mechanism of the spool 468, annular groove 470 and ball bearings 474) is relatively low, while the force available to lock the main rotor 408A and to release the rollers 462, thereby unlocking the backup rotor 408B, is relatively much higher. The large force margin (6:1) guarantees backup rotor 408B rotation within milliseconds of the state-change command to the solenoid 454. The unlocked, or fail operational, configuration of the alternative clutch brake 442B, i.e., after the malfunctioning main rotor 408A has been arrested and locked against rotation, and the backup rotor 408B unlocked for rotation, is as illustrated in the half-portion of the actuator below the centerline of FIG. 5.

Thus, making the state change from prime path motor drive to backup path motor drive of the alternative embodiment of the actuator 400 irreversible (except by subsequent intervention) enables not only the ability to use different clutch types that are best suited to the particular conditions of the respective rotor release or engagement, but also the ability to release and engage two clutches simultaneously using only one primary belleville spring 460 and a low-energy-signal solenoid 454. This alternative arrangement therefore offers extremely high mechanical reliability by virtue of its inert, prime-path-locked state.

Fifth Example Embodiment

A fifth example embodiment of a direct drive electromechanical linear actuator 500 in accordance with the present disclosure, comprising a single-motor linear actuator with helical-roller stator and other features suitable for miniaturization of the actuator, is illustrated in the cross-sectional side elevation view of FIG. 6. In place of the elongated planetary rollers of the previous embodiments, the example actuator 500 incorporates a plurality, e.g., four, disc-like rollers 524 mounted for independent rotation on a stator casing 506 and disposed in a radially symmetrical "star" arrangement in which the common diameters of the respective rollers are such that they overlap and require two planes of location to accommodate two sets each of two diametrically opposite rollers, as illustrated in the cross-sectional view of FIG. 7.

Figure 8:
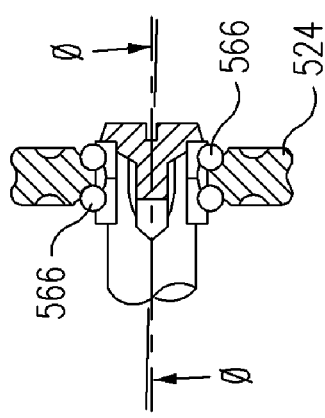
FIG. 8 is an enlarged cross-sectional detail view of a roller of the actuator of FIG. 6, as taken along the lines 8-8 therein; and, FIG. 9 is another enlarged cross-sectional detail view of a roller of the actuator of FIG. 6, as taken along the lines 9-9 therein.
Figure 7:
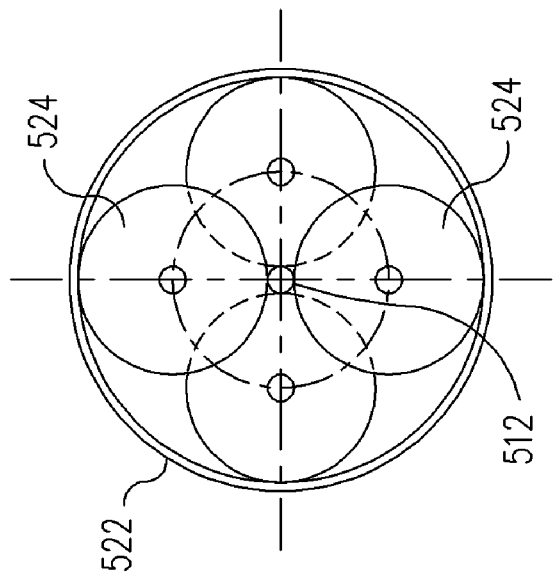
FIG. 7 is a cross-sectional view of the actuator of FIG. 6, as taken along the lines 7-7 therein.

The rollers 524 are mounted in ball-bearings 566 and their respective axes of rotation are mutually inclined in the same direction at a common helix angle $\phi$, as illustrated in the enlarged detail view of FIG. 8. An electric motor 502 is slidably supported in the stator casing 506 by splines 568 that move in axial keyways 570 such that the motor is capable of limited axial movement in the casing, but incapable of rotation therein. To accommodate this small axial movement of the motor, power and control signals may be conducted to the motor via extensible and retractable "service loop" wires 572. The spindle, or central shaft 512, of the motor comprises a precision-made, hardened cylinder having a relatively small diameter and a circumference that frictionally engages the circumferential surface of each of the rollers, as illustrated in FIG. 7.

Figure 9:
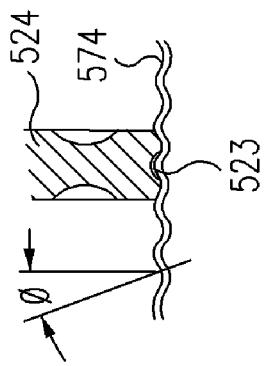

Convolutions 523 in the circumferential surface of each of the star rollers 525 engage in corresponding helical corrugations 574 in the thin-walled, cylindrical side wall of a hardened drum 522, wherein the helix angle $\phi$ matches the angle of inclination $\phi$ of the roller axes, as illustrated in the detail view of FIG. 9. The hardened rollers have their rims configured with two convolutions of a pitch given by $\pi D \tan \phi$, where $\phi$ is the helix angle and D is the drum diameter. As an example, in the case of a 10 mm diameter drum and a 1.5 degree helix angle $\phi$, the convolution pitch is 0.82 mm. The crests of the respective convolutions are truncated with a true cylindrical portion. During assembly, the drum is preferably strained slightly from a true cylindrical configuration to a more trochoidal shape, yielding four longitudinal zones of a smaller radius, interspersed with four longitudinal zones of a larger radius. The resulting beam-bending thereby imposed on the shell of the drum, coupled with the stiffening effect of the corrugations therein, provides an inward-directed restoring force that engages the rollers in diametral compression between the shell and the motor spindle 512.

The star roller mountings of the stator 508 are axially stiff, but radially are just sufficiently compliant to allow full contact between the rollers 524 and the motor spindle 512. This arrangement enables transfer of motor drive torque into the planetary system defined by the spindle, rollers and drum 522. A resistive film potentiometer (not illustrated) can be attached to the casing 506 and moved axially by connection with the translating drum for position sensing. Optionally, a motor drive control circuit board (not illustrated) can be mounted inside the casing. As described in connection with the first embodiment of actuator 100 above, the actuator 500 is mounted to external structure (not illustrated) in such a way as to be torque-reacting at the fixed end 521 opposite to the output end 520.

In operation, the rollers 524 of the fifth embodiment 500 are positioned in two planes of symmetry—therefore, the motor spindle 512 is always in force-balance and carries no journal loads, and hence, requires only a minimum thrust load to translate the motor 502 through small distances. This translation is given by d/D X linear distance moved by the drum 522. In the case of the 0.5 mm spindle and 10 mm diameter drum example above, this translation will be ¹⁄₂₀th of drum travel. The pressure angle of the roller convolutions is on the order of 20 degrees. The ultimate load carrying capacity of the actuator 500 is governed by the Hertzian stress at the eight symmetrical points of contact between the cylindrical portion on the top of the roller convolutions and the drive spindle. From calculations, it appears that, with Hertzian stresses of 125 ksi (i.e., approximately half the allowable), and with 4 rollers in a 10 mm diameter shell, axial forces of up to 4 lb. can be produced by the miniature actuator. This is accompanied by high stiffness, complete freedom from backlash and the potential for high frequency response, in a miniature package less than 0.5 inch in diameter.

Those of skill in the art will appreciate that, in the context of miniaturized actuators, such as the miniature actuator 500 described in the above example, it is difficult or practically impossible to achieve shallow helix angles $\phi$ with machined helical threads. However, as demonstrated above, they are readily achievable using directly contacting disc-rollers 524 skewed at a shallow angle $\phi$, and further, when expressed to the larger diameter D of the drum 522, the desired helical structure is readily producible by forming discrete hemi-cylindrical corrugations 574 that are capable of reacting axial loads. In additional, the use of the strain energy of a corrugated thin-walled cylinder, when deflected, advantageously produces a diametral force that, when coupled with the prevailing friction between the rollers and the drive spindle 512, creates the torque required to operate the device, thereby opening the way to miniaturized planetary roller devices of high mechanical advantage.

By now, those of skill in this art will appreciate that many modifications, substitutions and variations can be made in and to the materials, apparatus, configurations and methods of implementing the linear actuators of the present disclosure without departing from its spirit and scope. Accordingly, the scope of the present disclosure should not be limited to the particular embodiments illustrated and described herein, as they are merely example in nature, but rather, should be fully commensurate with that of the claims appended hereafter and their functional equivalents.

What is claimed is:

1. A direct drive electromechanical rotary-to-linear actuator, comprising:
    an elongated housing;
    a first electric motor, including a first stator fixed within the housing and a first rotor supported for rotation relative to the first stator;
    a second electric motor, including a second stator fixed within the housing and an elongated annular second rotor supported for rotation relative to the second stator; and,
    a planetary drive unit, comprising:
        an elongated central shaft coupled to the first rotor for conjoint rotation therewith and having one or more helical threads disposed on an external surface thereof;
        a planetary nut having a plurality of helical threads on an internal surface thereof and coupled to the annular second rotor within the annulus thereof for conjoint rotation therewith and for relative axial sliding movement therein;
        a plurality of planetary rollers disposed concentrically between the central shaft and the planetary nut, each roller having a helical thread on an external surface thereof that is complementary to and in rolling engagement with a thread of the shaft and a thread of the nut; and, a double-armature, double-disc solenoid clutch brake for independently locking respective ones of the first and second rotors against rotation relative to their respective stators.

2. The actuator of claim 1, wherein at least one of the motors comprises a pancake motor.

3. The actuator of claim 1, wherein the clutch brake comprises:
- a clutch plate mounted on the first rotor for conjoint rotation therewith and between the jaws of a caliper brake;
- a plurality of rocking levers having rollers disposed at respective first ends thereof and arranged to move between a first orientation in which the rollers are engaged in respective slots in an end of the second rotor, and a second orientation in which the rollers are disengaged from the slots;
- a plurality of first springs biasing the rocking levers into the first orientation;
- a second spring biasing the jaws of the caliper brake together and against the clutch plate; and,
- a spool moveable between a first position compressing the second spring and thereby relieving the bias of the second spring on the caliper brake jaws, and a second position urging the rocking levers against the bias of the first springs and into the second orientation thereof.

4. The actuator of claim 3, further comprising:
- means for releasably holding the spool in the first position; and,
- means for selectably releasing the spool from the first position for movement to the second position.

5. The actuator of claim 4, wherein the means for selectably releasing the spool comprises a solenoid.

6. The actuator of claim 5, wherein the means for releasably holding the spool in the first position comprises a plurality of ball bearings disposed in apertures in the spool and held captive in an adjacent circumferential groove by an arm of the solenoid.

7. The actuator of claim 1, wherein the first rotor and the central shaft are manufactured integrally with each other from a single piece of material.

8. The actuator of claim 7, wherein the single piece of material comprises a magnetically permeable material.

9. The actuator of claim 1, wherein at least one of the first and second stators comprises high-cobalt-content laminations and at least one of the first and second rotors comprises neodymium-iron magnets.

10. The actuator of claim 1, wherein the central shaft includes a hollow center, and further comprising a linear variable displacement transducer ("LVDT") disposed within the hollow center.

11. The actuator of claim 10, wherein the LVDT comprises:
- an elongated annular coil set having an end fixed relative to a first end of the actuator; and,
- an elongated rod of a magnetically permeable material slidably disposed inside the coil and having a first end fixed relative to a second end of the actuator.

12. The actuator of claim 1, wherein:
- the second rotor includes a plurality of axial grooves disposed on an interior surface thereof; and,
- the nut includes a plurality of axial splines disposed on an exterior surface thereof, each spline slidably disposed in a respective one of the axial grooves.

13. The actuator of claim 1, further comprising a pair of absolute-angular-position encoders respectively associated with each of the first and second motors.

14. A method for operating the actuator of claim 1, the method comprising:
- locking the second rotor against rotation relative to the second stator;
- freeing the first rotor for rotation relative to the first stator; and,
- actuating the first motor so as to move an output end of the actuator linearly with respect to the housing of the actuator.

15. A method for operating the actuator of claim 1, the method comprising:
- locking the first rotor against rotation relative to the first stator;
- freeing the second rotor for rotation relative to the second stator; and,
- actuating the second motor so as to move an output end of the actuator linearly with respect to the housing of the actuator.

* * * * *